2 Sheets—Sheet 1.

T. H. SMYTHE.
MOTORS.

No. 193,675. Patented July 31, 1877.

WITNESSES
INVENTOR

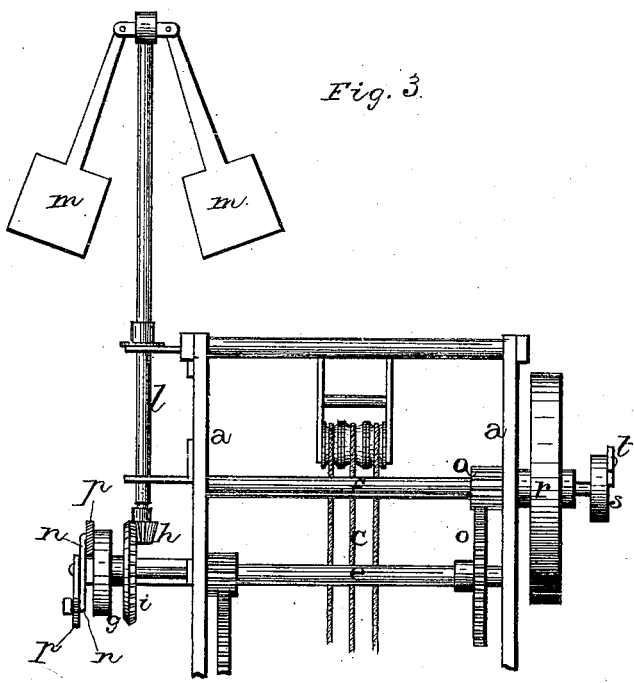

UNITED STATES PATENT OFFICE.

THOMAS H. SMYTHE, OF HARTFORD, MICHIGAN.

IMPROVEMENT IN MOTORS.

Specification forming part of Letters Patent No. 193,675, dated July 31, 1877; application filed July 21, 1877.

*To all whom it may concern:*

Be it known that I, THOS. HENRY SMYTHE, of Hartford, in the county of Van Buren, and State of Michigan, have invented certain new and useful Improvements in Motors; and I do hereby declare the following to be a full, clear, and exact description of the invention, such as will enable others skilled in the art to which it pertains to make and use it, reference being had to the accompanying drawings, which form part of this specification.

My invention relates to an improvement in motors; and it consists in the arrangement and combination of parts, that will be more fully described hereinafter, whereby a simple, cheap, and effective motor is produced for churning, pumping, and running light machinery of all kinds.

Figure 1:
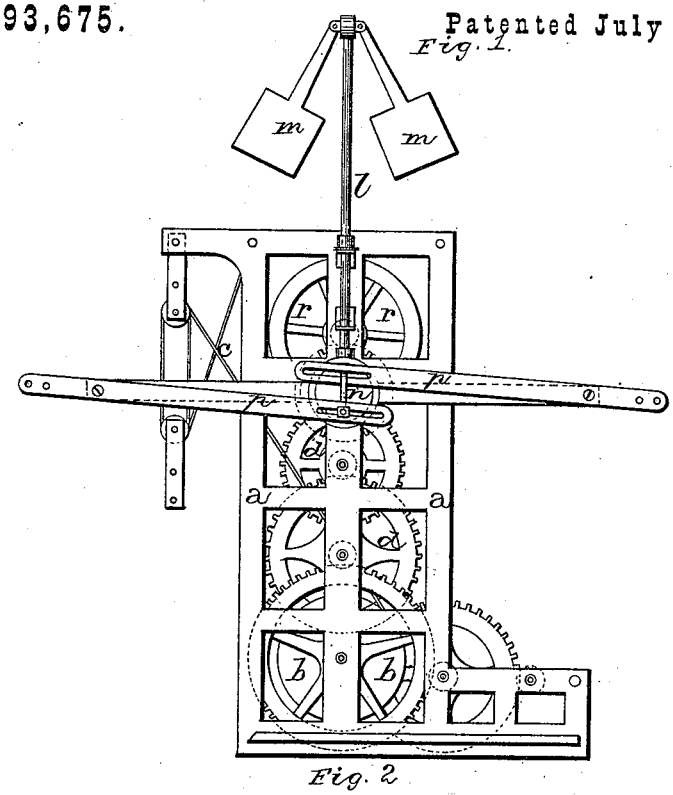
Figure 2:
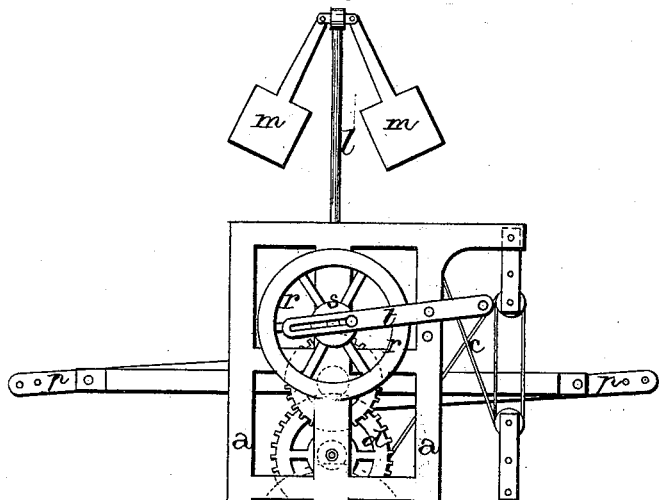

Figures 1 and 2 are side elevations of my invention, taken from opposite sides. Fig. 3 is a plan of the double crank.

$a$ represents a suitable frame, in the lower part of which is journaled the drum $b$, around which is wound the rope $c$ for hoisting the weight which operates the machinery. Meshing with the wheels on the ends of this drum are suitable wheels for turning the drum so as to wind up the rope, and a suitable mechanism, $d$, for imparting the motion of the drum in unwinding to the two shafts $e\ f$. The lower one of these shafts has one of its ends projecting through one side of the frame, and on which is placed the wheel $g$. Upon the inner side of this wheel are formed the bevel-teeth $i$, which mesh with and give motion to the pinion $h$ on the lower end of the shaft $l$, which is mounted vertically on the side of the frame $a$. To the top of this shaft $l$ are fastened the two fan-arms $m$, which act as governors to regulate the rapidity with which the machine shall run. By using fan-arms instead of the usual balls a much more powerful check is placed upon the machine, as the motion of the arms is retarded more and more by the air the faster they go. To the outer side of this wheel $g$ is secured the double-crank $n$, upon each of the bends of which is fastened one end of the slotted lever $p$. The outer ends of these levers are pivoted upon suitable bearings on the side of the frame, and to the shorter ends, outside of these bearings, are fastened the pump-handle or piston, the dasher of a churn, or any other light machine that is to be run. As the double crank $n$ sweeps around, the two levers are alternately raised and depressed at their ends, giving an even and powerful stroke. Upon the inner end of this shaft $e$ is placed the gear-wheel $o$, which operates the pinion $q$ on the upper shaft $f$. The outer end of this shaft, that projects through the side of the frame, has the balance-wheel $r$ secured to it, and on its extreme end is placed the wheel $s$, provided with a wrist-pin, which passes through the slotted end of the lever $t$. To the outer end of the lever $t$ is to be fastened the dasher of a churn, or any similar light work.

Thus it will be seen that by means of the two shafts $e\ f$, and the mechanism for operating them, there are three operating levers set in motion, all of which are adapted to perform a different kind of work. Should it be desired to throw the whole force of the machine upon a single lever, the two others may be detached, if so desired.

Having thus described my invention, I claim—

1. The combination of the drum $b$, weighted cord $c$, mechanism $d$, shaft $e$, wheel $g$, shaft $l$, fan-arms $m$, double crank $n$, and slotted levers $p$, substantially as shown.

2. In combination with the drum $b$, cord $c$, mechanism $d$, shaft $e$, wheel $g$, shaft $l$, fan-arms $m$, crank $n$, and levers $p$, the shaft $f$, balance-wheel $r$, and slotted lever $t$, substantially as set forth.

In testimony that I claim the foregoing I have hereunto set my hand this 21st day of July, 1877.

T. H. SMYTHE.

Witnesses:
F. A. LEHMANN,
L. S. CHAPIN.